(12) United States Patent
Vlothuizen

(10) Patent No.: US 11,747,854 B2
(45) Date of Patent: Sep. 5, 2023

(54) METHOD OF SYNCHRONIZING A PLURALITY OF DEVICES AND SYSTEM CONFIGURED FOR PERFORMING THE METHOD

(71) Applicant: Nederlandse Organisatie voor toegepast-natuurwetenschappelijk onderzoek TNO, 's-Gravenhage (NL)

(72) Inventor: Wouter Jan Vlothuizen, 's-Gravenhage (NL)

(73) Assignee: Nederlandse Organisatie voor toegepast-natuurwetenschappelijk onderzoek TNO, 's-Gravenhage (NL)

(*) Notice: Subject to any disclaimer, the term of this patent is extended or adjusted under 35 U.S.C. 154(b) by 151 days.

(21) Appl. No.: 17/442,001

(22) PCT Filed: Mar. 27, 2020

(86) PCT No.: PCT/NL2020/050210
§ 371 (c)(1),
(2) Date: Sep. 22, 2021

(87) PCT Pub. No.: WO2020/197396
PCT Pub. Date: Oct. 1, 2020

(65) Prior Publication Data
US 2022/0179445 A1 Jun. 9, 2022

(30) Foreign Application Priority Data
Mar. 27, 2019 (EP) .................................... 19165419

(51) Int. Cl.
*G06F 1/12* (2006.01)
*H04L 7/00* (2006.01)

(52) U.S. Cl.
CPC .............. *G06F 1/12* (2013.01); *H04L 7/0008* (2013.01)

(58) Field of Classification Search
CPC ................. G06F 1/12; G06F 9/44; G06F 1/32
See application file for complete search history.

(56) References Cited

U.S. PATENT DOCUMENTS

| | | | |
|---|---|---|---|
| 10,474,779 B1* | 11/2019 | Leung | G06F 30/35 |
| 2017/0289609 A1* | 10/2017 | Liu | H04N 21/4394 |
| 2018/0352509 A1* | 12/2018 | Seshadri | G06F 11/3024 |

OTHER PUBLICATIONS

European Patent Office, International Search Report in corresponding International Application No. PCT/NL2020/050210, dated Jun. 19, 2020 (2 pages).

(Continued)

*Primary Examiner* — Keshab R Pandey
(74) *Attorney, Agent, or Firm* — Leydig, Voit & Mayer, Ltd.

(57) ABSTRACT

The present document relates to a method of synchronizing devices, wherein each device operates in sync with an internal clock signal which is periodic to thereby define time cycles, at least one of the internal clock signals being periodic at a first frequency. The devices are mutually synchronized via a party line. The method comprises providing a system clock signal periodic at a second frequency smaller than the first frequency defining sequential system clock cycles; and synchronizing the internal clock signal with the system clock signal. At least one device triggers, in sync with the system clock signal, a system synchronization event comprising changing a signal status of a common party line signal on the party line and monitoring the common party line signal. The changing and monitoring are performed in sync with the system clock signal.

15 Claims, 3 Drawing Sheets

(56) References Cited

OTHER PUBLICATIONS

Li-Hua Sun et al., "Scalable Self-Adaptive Synchronous Triggering System in Superconducting Quantum Computing," arxiv.org, Cornell University Library, 201 Olin Library Cornell University Ithaca, NY 14853, (Jun. 11, 2018) XP080889137.

Anonymous, "Multiple AWG's Synchronization," Euvis Application Notes, pp. 1-3 (May 10, 2012) XP055621169, retrieved from the Internet: URL http://www.euvis.com/downloads/mod/sync/AN_AWG_Synchronization.pdf [retrieved on Sep. 11, 2019] whole document.

* cited by examiner

METHOD OF SYNCHRONIZING A PLURALITY OF DEVICES AND SYSTEM CONFIGURED FOR PERFORMING THE METHOD

CROSS-REFERENCE TO RELATED APPLICATIONS

This patent application is a U.S. National Phase of PCT International Application No. PCT/NL2020/050210, filed Mar. 27, 2020, which claims priority to European Application No. 19165419.3, filed Mar. 27, 2019, which are both expressly incorporated by reference in their entireties, including any references contained therein.

FIELD OF THE INVENTION

The present invention is directed at a method of synchronizing a plurality of devices, wherein each of the plurality of devices operates in sync with an internal clock signal such that actions performed by each device are timed based on time cycles defined by a periodicity of the internal clock signal, the internal clock signal of at least one of the devices being periodic at a first frequency, wherein the plurality of devices is mutually synchronized via a party line to which all devices of the plurality of devices is connected. The invention is further directed at a system arranged for performing the method.

BACKGROUND

A plurality of devices that cooperatively is to perform one or more time critical tasks, typically may do so on the basis of a common synchronization between the cooperating devices. Typically, this may be achieved by sharing a common clock signal. Although this provides a perfectly workable solution in many situations, it no longer provides a sufficiently effective solution for very fast time critical processes and/or processes between distributed devices that may be remote from each other. In particular, it these situations the propagation delay of travelling signals (from device to device) puts a constraint on the achievable operating frequencies of devices.

For example, consider an arbitrary waveform generator (AWG) operating at an internal frequency of 250 megahertz (MHz) that has to operate in sync with similar AWG devices operating at this same frequency. The devices are interconnected by wiring, e.g. optical fiber, such that the furthest device is connected at a cable distance of 10 meter away from the considered AWG device. Taking a rough estimate, signals transmitted through the optical fiber travel at a velocity of 70% of the speed of light, i.e. $2*10^8$ meter/second. This means that the full 10 meter optical fiber cable can be travelled by an optical signal in only 50 nanoseconds. However, considering that the internal frequency of the AWG is 250 MHz, a single time cycle of the AWG has a duration of only 4 nanoseconds. Hence, the 50 nanoseconds travel time (100 nanoseconds round trip) corresponds with 13 time cycles of the AWG considered (25 cycles round trip). To enable these devices to jointly perform certain tasks simultaneously or near-simultaneously, thus requires a very accurate form of synchronization. To trigger both devices to generate an event during coincidental time cycles, the trigger signal must be available to both devices during these coincidental time cycles. This requires the trigger signal to be available everywhere in the system of devices within an accuracy of less than 4 nanoseconds to be received during the same cycle. Ideally, though, the accuracy must be even better (e.g. within 2 nanoseconds or less) even. The standard manner of synchronizing the devices for this reason does not suffice.

SUMMARY OF THE INVENTION

It is an object of the present invention to provide a synchronization method for synchronizing a plurality of devices, that overcomes the disadvantages of prior art methods, that is very accurate and has a relatively simple design such that it can be implemented without much difficulty.

To this end, there is provided herewith a method of synchronizing a plurality of devices, wherein each of the plurality of devices operates in sync with an internal clock signal such that actions performed by each device are timed based on time cycles defined by a periodicity of the internal clock signal, the internal clock signal of at least one of the devices being periodic at a first frequency, wherein the plurality of devices is mutually synchronized via a party line to which all devices of the plurality of devices is connected; the method comprising: providing, from a system clock to each of the plurality of devices, a system clock signal which is periodic at a second frequency smaller than the first frequency, the second frequency thereby defining a plurality of sequential system clock cycles; synchronizing, in each of the plurality of devices, the internal clock signal based on the received system clock signal; and triggering, by at least one device of the plurality of devices and in sync with the system clock signal, a system synchronization event comprising: changing, by the at least one device during a first time cycle, a signal status of a common party line signal on the party line such as to signal the synchronization event; and monitoring, by each of the plurality of devices during a second time cycle, the common party line signal on the party line for registering the change in signal status of the common party line signal; wherein the second cycle occurs later than the first time cycle and is separated therefrom by one or more further time cycles, wherein a duration from a start of the first cycle to an end of the second cycle is less than a duration of one system clock cycle.

The present method uses two clock signals, i.e. a 'slow' system clock signal and a 'fast' internal clock signal, to coordinate synchronization actions performed on a party line. The system clock signal provides a main clock signal to which all internal clock signals are aligned, i.e. synced, by each of the devices. This internal clock signals are device individual internal signals that define the step size or time cycle wherein acts are performed and events are registered within each device. The slow system clock signal is also used as a basis to trigger a synchronization event on the party line. If one of the devices requires to signal an upcoming synchronization of the devices in the system, it changes the party line signal status (e.g. from high to low). However, in accordance with the invention, the policy is enforced that this may only be performed during the first time cycle referred to above. Other devices monitor the party line, however this monitoring, according to the enforced policy, is also allowed to be performed only during a designated time cycle, i.e. the second time cycle. Because the trigger signal is based on the system clock signal, which is received by all devices, each device monitors the party line during a time cycle which is a same number of time cycles after receipt of a change in the system clock signal. Hence, upon registering a change in the signal status, all devices jointly perform the required acts in a well orchestrated manner.

By using a slow system clock in combination with the fast internal clock, a time budget is available for performing the synchronization across the system which is equal to a number of time cycles of the fast internal clock. This enables the signal change on the party line to be distributed across the system, taking the propagation delay into account, such that it is available to all devices in the system after a number of time cycles. The moment of monitoring occurs for all devices at more or less the same time, and at a moment on which the signal change on the party line is visible to all devices. Hence, the synchronization performed responsive to the receipt of this signal status change during the monitoring step, is performed at more or less the same time.

The synchronization event may be triggered by just one device, or by a number or even all of the devices. The party line signal will change upon the first of the devices performing the synchronization event. The change in the party line signal may be a transition from high to low or from low to high. However, it has been found that the measurability of a down-going transition is better measurable, there is a preference for the synchronization event being a pulling down of the party line signal, i.e. a transition from high to low.

In accordance with some embodiments, the method further comprises a step of counting, by each of the plurality of devices, the time cycles defined by the internal clock signal using a sync counter; wherein the step of triggering is performed at a predefined sync counter value. Here, the triggering is performed at a certain value of the sync counter. The monitoring is performed at another value of the sync counter, later than the triggering. The time cycle budget thus corresponds with the number of cycles between the actual change in signal status on the common party line (taking place directly after or a limited number of cycles after triggering) and the monitoring. Within this time cycle budget, the change in the common party line signal must be conveyed to the other devices to be noticeable on the party line at each device during monitoring.

In accordance with some embodiments, the system clock signal is distributed to each device using a clock distribution system, wherein the distribution system is arranged for delivering the system clock signal to all devices simultaneously and such that for each two devices of the plurality of devices a travel time difference between travel times of the system clock signals to each of the two devices is less than a single time cycle as defined by the first frequency, preferably less than half a time cycle, more preferably less than a quarter time cycle. A slight difference in synchronicity between system clock signals as received by the devices in the system is allowed. Because the signals are transmitted over a fixed infrastructure (e.g. optical fiber, copper wire, wireless transmission) the skewness in receipt of the system clock signal by the various devices is fixed over time—it will not change. Moreover, because the propagation velocity of the signals is known as well, the non-synchronicity of the received system clock signals by the various devices can be tuned by adapting the cable lengths. For example, in accordance with some embodiments, the clock distribution system comprises a cable between each device and the system clock to thereby include a plurality of cables, wherein a difference in cable length between each two cables of the plurality of cables is smaller than 1 meter, preferably smaller than 40 centimeter, more preferably smaller than 20 centimeter. Considering, for example, a propagation velocity of $2*10^8$ m/s, a length difference of 20 centimeter corresponds with a 1 nanosecond time difference.

In a preferred embodiment, the first frequency is an integer multiple times as large as the second frequency. In this manner, it is assured that a integer number of time cycles fit within a single cycle of the system clock. The internal clock signal is synchronized such as to be aligned to the system clock signal. The system clock transitions (i.e. considering the system clock signal to be a block signal varying between 0 and 1 periodically) therefore always coincide with transitions in the internal clock signal, and hence occur in a predictable time cycle of each device. In combination with using a sync counter, the sync counter may in some embodiments be periodically reset in synch with the system clock signal, such that this counter would periodically count a fixed number of time cycles before restarting the count. Hence, a preselected time cycle to be used for monitoring the party line may be agreed within the system, such that all devices monitor the party line during the same time cycle (e.g. 15 time cycles after start).

The first frequency may be within a range of 1 megahertz to 10 gigahertz, preferably between 50 megahertz and 1 gigahertz (GHz), more preferably between 100 megahertz (MHz) and 500 megahertz, for example 250 megahertz. The second frequency is within a range of 20 kilohertz to 2 gigahertz, preferably between 1 megahertz and 200 megahertz, more preferably between 1 megahertz and 100 megahertz, for example 10 megahertz. Using a 10 MHz system clock with a 250 MHz internal clock provides for 25 time cycles during each system clock cycle. This number is indicative of the total available time budget for performing the whole synchronization, including signal transmission. Some cycles are used within the triggering device and to resolve inaccuracies in synchronization, but this number of cycles is fixed and known. Hence the time budget for signal transmission on the party line is fixed and known as well, and can be tuned to enable all device to see the signal status change on the party line during monitoring thereof at the second time cycle.

In some embodiments, the sync counter is periodically reset once every system clock cycle, wherein the first time cycle and the second time cycle are separated in time by half a system clock cycle. This allows the second part of the system clock cycle to be available for sending return signals to the transmitting triggering device.

In some embodiments, the internal clock signals of all devices of the plurality of devices are periodic at the first frequency, such that all devices operate at a same internal clock frequency. However in other embodiments, for one or more devices of the plurality of devices the internal clock signals are periodic at one or more further frequencies different from the first frequency, and wherein the step of changing is performed in response to a first signal change of the system clock signal and the step of monitoring is performed in response to a second signal change of the system clock signal. In these latter class of embodiments, the steps of triggering the changing of the signal status on the party line and performing the monitoring are directly based on transitions in the system clock signal, because the internal clock signals run at different frequencies and therefore their time cycles are not the same. Alternatively, in cases the different internal clock signals are known, this may be compensated for in each device by using a different sync counter value for performing the monitoring, for example, such that this takes place more or less simultaneous in all devices. Each device operates at a time cycle that is determined by its internal clock signal.

In accordance with a second aspect, there is provided a system comprising a plurality of devices, a system clock, a clock distribution system between the system clock and each device, and a party line interconnecting the plurality of devices and configured for enabling mutual synchronization of the devices via the party line, wherein each device operates in sync with an internal clock signal such that actions performed by said device are timed based on time cycles defined by the periodicity of the internal clock signal, wherein at least one of the devices is arranged for providing the internal clock signal such that it is periodic with a first frequency, wherein the system clock and the clock distribution system are configured for providing, to each of the plurality of devices, a system clock signal which is periodic at a second frequency smaller than the first frequency, the second frequency thereby defining a plurality of sequential system clock cycles; wherein each device is configured for synchronizing its internal clock signal based on the received system clock signal; and wherein at least one device of the plurality of devices is configured for triggering, in sync with the system clock signal, a system synchronization event; the system synchronization event comprising: changing, by the at least one device during a first time cycle, a signal status of a common party line signal on the party line such as to signal the synchronization event; and monitoring, by each of the plurality of devices during a second time cycle later than the first time cycle, the common party line signal on the party line for registering the change in signal status of the common party line signal; wherein each device is configured for performing the monitoring during the second cycle after one or more further time cycles have passed, and such that a duration from a start of the first cycle to an end of the second cycle is less than a duration of one system clock cycle. The synchronization event may be triggered by just one device, or by a number or even all of the devices. The party line signal will change upon the first of the devices performing the synchronization event. The change in the party line signal may be a transition from high to low or from low to high. However, it has been found that the measurability of a down-going transition is better measurable, there is a preference for the synchronization event being a pulling down of the party line signal, i.e. a transition from high to low.

The present synchronization method may be applied in many kinds of different applications wherein devices are to be synchronized. However, its reliability makes the synchronization method particularly useful in quantum computing, for example. Hence, in some embodiments of the present invention, the devices are elements of a quantum computer.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
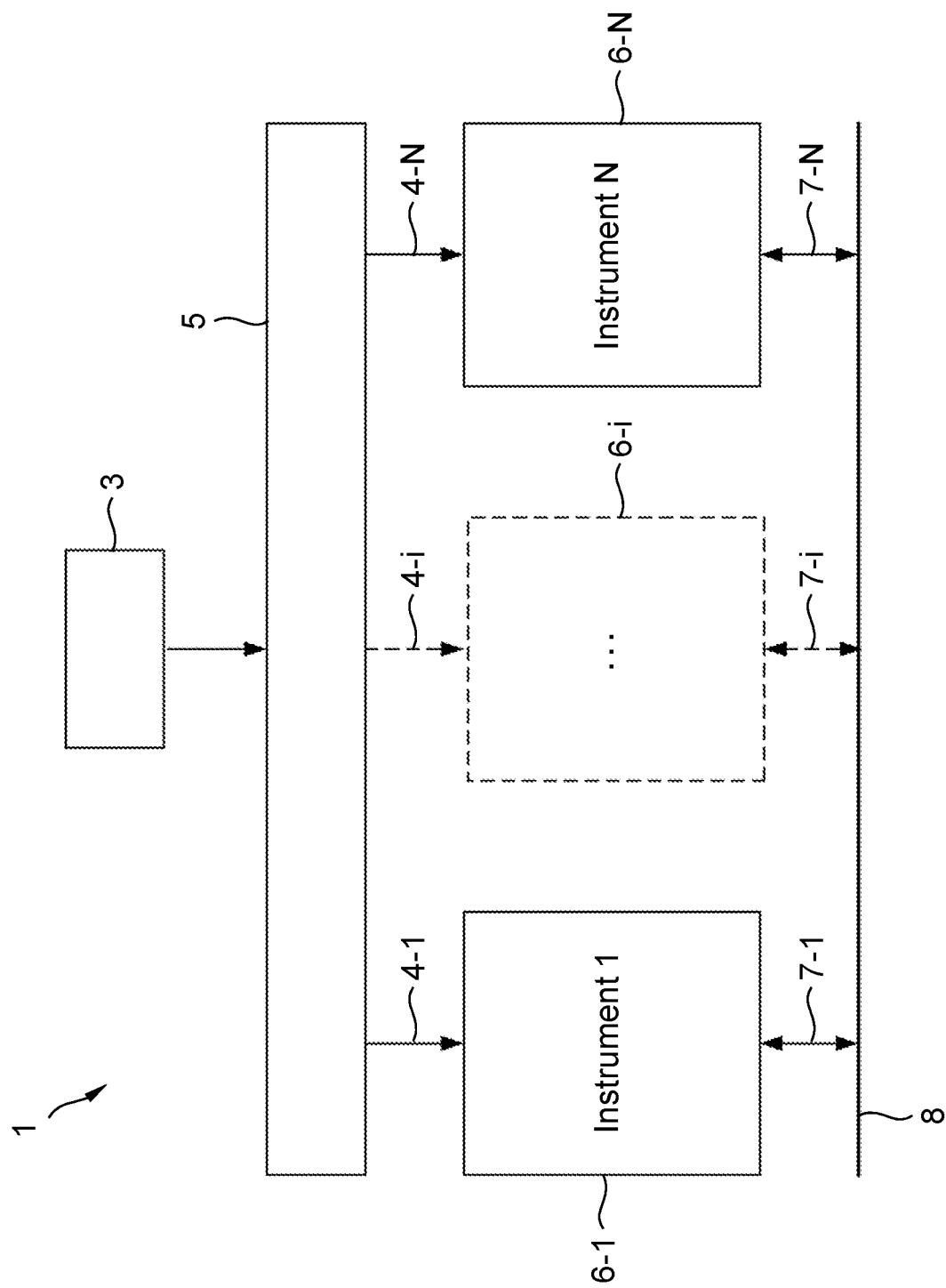
FIG. 1 schematically illustrates a system in accordance with an embodiment of the present invention.

FIG. 1 schematically illustrates a system in accordance with an embodiment of the present invention. The system 1 comprises a system clock 3. The system clock 3 is configured for providing a system clock signal to the elements of the system 1. The system clock signal is a global clock signal to be used within the system 1. For example, the system clock signal may be a periodic block signal having a periodicity or frequency of 10 megahertz. The skilled person may appreciate that any other frequency or waveform may likewise be applied, provided (to be explained later) that multiple operating time cycles of an internal clock signal of instruments 6 within the system 1 will fit in a single cycle of the system clock signal 32.

The system clock signal 32 will be distributed via a clock distribution system 5. The clock distribution system provides the system clock signal 32 via a plurality of communicative connections 4 towards a plurality of instruments 6 of the system. Preferably, the distribution of the system clock signal 32 to each of the instruments 6 is performed such that propagation delays between the system clock 3 and each of the instruments 6 via the clock distribution system 5 are more or less equal. In this way, edges of the block signal of the system clock signal 32 will be received by each of the instruments 6 more or less at the same time. However, this is not an essential requirement for the system, as long as any timing differences or delays of the system clock signal between the various instruments 6 are fixed and predictable. This allows to compensate for any delays, where necessary, later.

The system 1 further comprises a plurality of instruments 6, in FIG. 1 numbered as 6-1 . . . 6-$i$ . . . 6-N. FIG. 1 illustrates schematically a total of i instruments 6, where $1 \leq i \leq N$. The system 1 may comprise any desired number of instruments, and thus N may be any integer value ranging from 2 to infinity.

Hereinafter, the first instrument 6 in the system 1 will be designated by reference numeral 6-1, and the last instrument 6 of the system 1 will be designated by reference numeral 6-N. Any arbitrary instrument 6 in between the first and the last instrument, will be designated reference numeral 6-$i$.

Each of the instruments 6-1 to 6-N comprises a system clock input 4 and a party line input/output 7. The input and output of each of the instruments 6-1 to 6-N is in a similar manner designated as 4-1 to 4-N and 7-1 to 7-N. The instruments 6-1 to 6-N, as described, are all connected to a party line 8. The common party line 8 bears a common party line signal that may be received via the input/output 7-$i$ (where i ranges from 1-N). The party line 8 may be used as follows.

By default, the party line signal on party line 8 may be either high ("1") or low ("0"). Considering a party line signal which by default starts as a low signal having the value ("0"), each of the instruments 6-1 to 6-N is enabled to pull the party line signal to high (value "1") at any time. If the party line signal on party line 8 is pulled high by any instruments 6-1 to 6-N (or by multiple instruments 6), it will remain high until all instruments 6-1 to 6-N have released the party line signal such that it becomes low again. A party line 8 may be achieved in this manner in an optical or electrical arrangement. Although the use of optical fiber connections may sometimes be preferred, a party line 8 bearing a common party line signal may be implemented in an electrical design as well as in an optical design. For example, in an electrical system it is easier to design a logical 'OR' function wherein the party line changes upon the first device to perform the synchronization event. For example, a transistor in combination with a pull-up resistor may be applied.

In an electrical arrangement the party line 8 may by default be low (e.g. voltage level: 0V) or high (e.g. voltage level: 5V). For example, the party line signal on party line 8 may be a high signal of 5 volts maintained using a pull-up resistor. Each of the instruments 6-1 to 6-N may be enabled, to pull the party line signal to low by selectively connecting it to ground. The party line signal on party line 8 will only become high again when each of the instruments 6-1 to 6-N have released the party lines via their output 7-1 to 7-N, in which case the voltage source maintains the party line signal at 5 volts again. It may be appreciated, alternatively the party line signal on party line 8 may be kept at 0 volts, and may selectively be pulled up by any of the instruments 6-1 to 6-N to 5 volts. In an optical design, the party line 8 may be implemented differently. For example, in an optical design the party line signal on party line 8 may by default be low (i.e. dark, the fiber not being lit). Each instrument 6-1 to 6-N may be enabled to light the optical fiber such that the signal on the fiber becomes high. If multiple instruments 6 light the party line 8 in this manner, and one or more (but not all) instruments cease lighting of the fiber, the signal on party line 8 will remain high. Only if all instruments 6-1 to 6-N will cease lighting of the party line 8, the party line 8 will become low (dark) again. Hence, the party line will remain high until all instruments 6-1 to 6-N have released it.

The party line 8 will be used in the system 1 for coordinating the synchronization process amongst the various devices 6-1 to 6-N. To this end, any of the instruments 6-1 to 6-N may initiate synchronization by pulling the party line 8 high, and the other instruments 6-1 to 6-N will become aware of the signal status change on the party line 8, thereby initiating a synchronization action.

Figure 2:
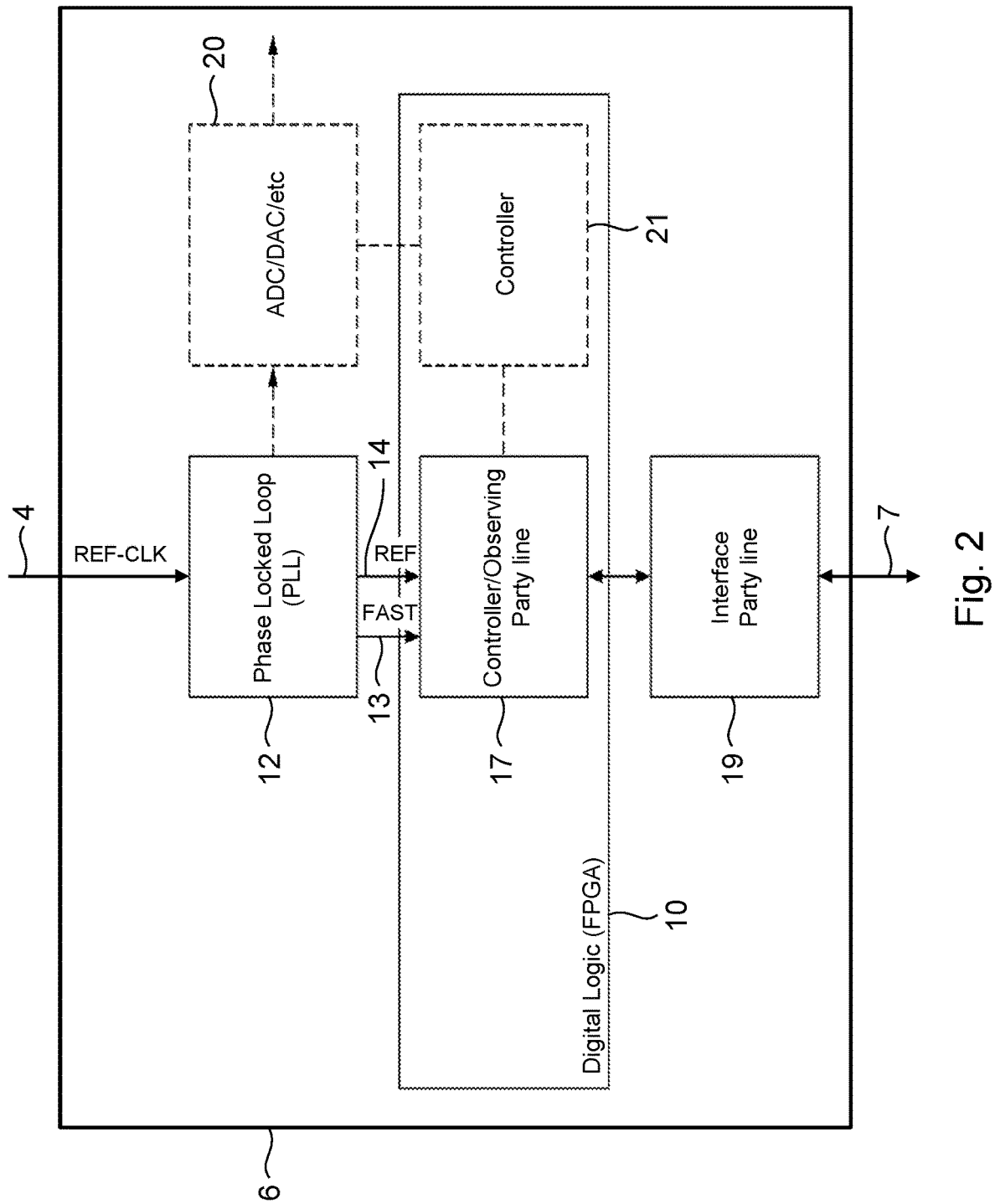
FIG. 2 schematically illustrates a device that may be part of a system in accordance with an embodiment.

FIG. 2 schematically illustrates a device 6 that may be used in a system 1 of FIG. 1. The device 6 comprises a system clock input 4 and a party line input/output 7. The instrument 6 can by any kind of instrument to be used in the system 1 to be synchronized, and may for example be a sensing instrument, an acting instrument or some kind of machine. For example the instrument 6 may include an analog-to-digital converter (ADC) and/or digital-to-analog converter (DAC) element 20 which allows to convert any analog electrical signal into a digital signal that may be used in the system. For example system 1 may be an analysis system for analyzing the measurement signals of a plurality of measurement devices that monitor a certain process or scientific experiment. Sensors in the system 1 may be connected via one or more ADC's to the system such as to provide their sensing signals for further analyses. A central part of each device 6 may be formed by a field programmable gate array 10 operating the device. The main part of the FPGA 10 may be a controller 21 that performs processing of the signals received from the ADC 20 or which provides signals converted by the DAC 20. The elements 20 and 21 are functional parts of the device 6, but do not (within this context) play a role in the synchronization method described herewith.

The system clock signal 32 is received by the system clock input 4 and is provided to a phase locked loop (PLL). A phase locked loop unit is a control system that generates an input signal received via input 4. The phase locked loop 12 receives the system clock signal via input 4 and provides, at its outputs 13 and 14 a reference signal via output 14 which is identical to the system clock signal received at input 4. At output 13, it further provides a fast internal clock signal that is in sync with the system clock signal received at input 4. Hence, both the signals provided via output 13 and 14 of the PLL are in sync with the input signal received by input 4. The synchronized system clock signal at output 14 and the internal clock signal at output 13 are both provided to a dedicated controller 17 that controls all actions performed on the party line 8 to which device 6 is connected via input/output 7. The dedicated controller 17 is enabled to trigger a device 6 to pull the party line signal to high (or to low) when desired. The dedicated controller 17 is also configured for observing the party line 8. Therefore, the dedicated controller 17 plays an important role in coordinating the various method steps of the synchronization method of the present invention within the device 6. The dedicated controller 17 is connected to a party line interface 19 that performs the actual actions on the party line and provides the party line signal status to the dedicated controller 17 when needed.

Figure 3:
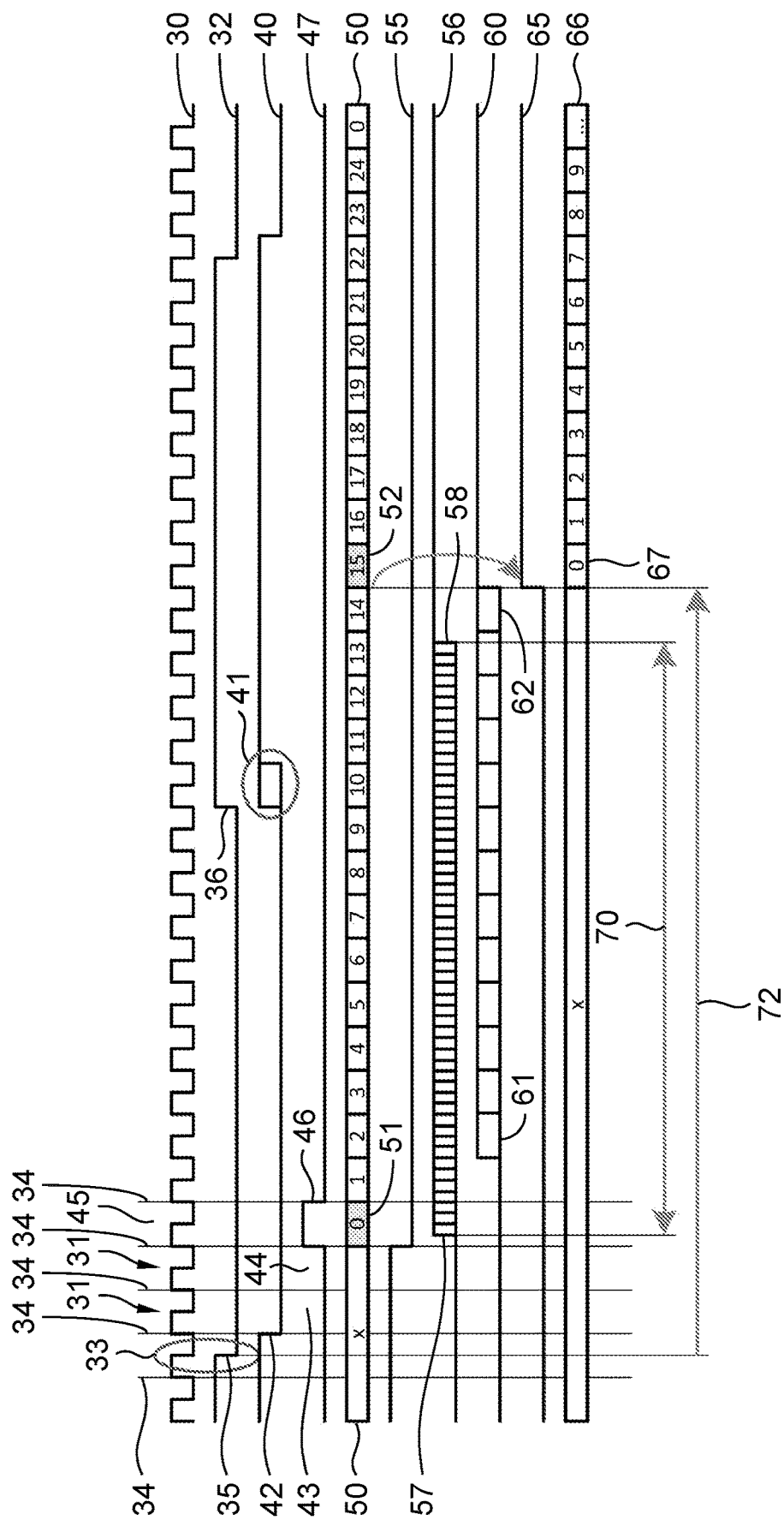
FIG. 3 schematically illustrates operational signals within a system that are illustrative of a method in accordance with an embodiment.

FIG. 3 schematically illustrates a synchronization method in accordance with the present invention, by illustrating the various operational signals of interest that are used within the system 1. In FIG. 3, the fast internal clock signal is indicated by reference numeral 30. The slow system clock signal is indicated by reference numeral 32. In the example illustrated in FIG. 3, the internal clock signal 30 is a 250 megahertz periodic block signal. It may be appreciated, a clock signal which is periodic at a different frequency or is periodic with a different waveform (e.g. triangular, sinus, or anything else), may likewise be applied when desired. The use of block signals is convenient in a digital system, and is therefore used in the present example. The periodicity of the fast internal clock signal 30 defines a plurality of time cycles 31 which in FIG. 3 are separated with delimiters 34. The start of each time cycle 31 is triggered by the rising edge of the fast internal clock signal 30. The fast internal clock signal 30 and the slow external system clock signal 32 are synchronized with respect to each other. Here, in FIG. 3, synchronization has been performed by aligning the falling edges of internal clock signal 30 and external system clock signal 32 as illustrated within the oval 33. The falling edge 35 of system clock signal 32 thus falls halfway during a time cycle of the internal clock signal 30. It may be appreciated, synchronization between internal clock signal 30 and system clock signal 32 may be performed by aligning the rising edge of internal clock signal 30 with the falling edge of system clock signal 32 or in any other way. This is not important for the method of the present invention, as long as the both signals 30 and 32 are synchronized. Internal signal 40 illustrates the sampled version of the system clock signal 32 within instrument 6. As the start of each time cycle of instrument 6 is indicated by delimiters 34, in the sampled signal 40 the falling edge of system clock signal 32 will occur half a time cycle later than when it actually occurred in system clock signal 32. This is illustrated in the sampled signal 40. In case the falling edge of system clock signal 32 would have been synchronized with the rising edge of internal clock signal 30, the sampled signal 40 would show the falling edge 42 a full time cycle earlier. Similarly, the rising edge 36 of the system clock signal 32 will also be represented in the sampled signal 40. However, dependent on how the signals 32 and the 30 are synchronized with each other, this rising edge may appear anywhere within the circle 41 illustrated in FIG. 3.

Operative signal 47 is a trigger signal which is provided responsive to the detection of the falling edge 42 of system clock signal 32. It is based on the sampled version of the system clock signal provided by sampled signal 40. Because the dedicated controller 17, in this example, requires two time cycles for processing the detected falling edge 42 and providing a trigger 46 in response thereto, two time cycles 43 and 44 are shown between the occurrence of the falling edge 42 in the sampled signal 40 and the rising edge of the trigger 46 in trigger signal 47.

The dedicated controller 17, simultaneously with generating trigger 46 in trigger signal 47, reset a sync counter 50 to value "0". This is illustrated by reference numeral 51. The sync counter 50 is incremented at each time cycle, counting from "0" upwards. Simultaneously with the generation of trigger 46, during the time cycle 45 which is associated with sync counter value "0" at 51, the party line interface 19 pulls the party line signal high. This is represented by the party line FPGA driver signal 55. Thereafter, any of the other devices 6 at any time may receive the party line signal status change as is propagates through the party line 8. As explained here in above, considering the party line 8 is an optical fiber, the optical signals propagate at velocity $2*10^8$ m/s and thereby travel the distance of 1 meter optical cable in 5 nanoseconds. In the example of FIG. 3, the signal status change of the party line signal of party line 8 may be received by any of the instruments 6 in the system 1 somewhere during moments 57 and 58 illustrated. The time duration between moments 57 and 58 resembles the propagation delay tolerance of the synchronization method of the present invention. A signal status change that is detectable to the dedicated controller 17 via party line interface 19, roughly requires one time cycle to be processed by the dedicated controller 17. Therefore, in the synchronized party line receipt signal 60, the rising edge that indicates the availability of the party line signal change to the dedicated controller 17 will be available during any of the time cycles between time cycle 61 and 62 illustrated in FIG. 3.

In accordance with the present invention, dependent on the sync counter a specific time cycle is predefined in the synchronization policy for allowing monitoring of any changes to the party line signal. Here, any monitoring is performed during the time cycle that corresponds to the sync counter value "15". Therefore, in the sampled party line signal 65 used by dedicated controller 17, this rising edge is available as of the time cycle corresponding with sync counter value "15". Because all the devices 6-1 to 6-N in FIG. 1, in accordance with the agreed policy, perform the monitoring of the party line when sync counter 50 reaches value "15", the signal status change under party line 8 is received by all instruments 6-1 to 6-N more or less at the same time. In case theoretically all the instruments 6-1 to 6-N would receive the system clock signal 32 with an identical propagation delay through the clock distribution system 5, there would be no difference in time in the occurrence of edges in the system clock signal 32. A synchronization would in that case be performed perfectly by all devices at exactly the same time. In reality, however, small differences in the propagation delays of the system clock signals as received by the various devices 6-1 to 6-N are expectable and allowed. These timing differences will show up in the synchronization of actions performed by the various instruments 6-1 to 6-N which are mutually synchronized on the basis of the present method. To the method of the present invention, this does not matter as long as these differences are known and predictable.

Upon detection of the signal status change in the sampled signal 65, at time cycle 52 when sync counter reaches the value "15", a further counter or TICK counter 66 may be reset to indicate the first time cycle after synchronization. In time cycle 67, the TICK counter therefor has a value of "0". Thereafter, the counter will be incremented each time cycle 31.

The synchronization delay, the delay between synchronization of the two clock signals 30 and 32 and actual synchronization of the various devices 6-1 to 6-N, is indicated by 72. In fact, the length of time between the start of time cycle 45 when sync counter 50 has a value "0", and the beginning of time cycle 52 when monitoring of the party line 8 is allowed, defines the available time budget for performing the synchronization amongst the various devices. As may be appreciated, in absence of the slow system clock signal 32, synchronization between the various devices would have to be performed on the basis of the fast clock signal 30 of the various devices. Synchronization would have to be performed within a single time cycle 31 of the fast internal clock signal 30. Sending a trigger through any distribution network towards another device typically requires more than a single time cycle, and the time of receipt of the trigger by each device will not be known. Conventionally, a central fast clock signal could be distributed to a plurality of devices via (almost) equal cable lengths so that—as with the present system clock signal 32—the mutual differences are kept fixed and small. However, coordination of actions to be performed jointly by multiple devices will be more complex by mutually communicating an agreed time slot. This has a negative effect on the overall performance of the system. In the system of the present invention, all actions may be coordinated by triggering via the party line 8.

The slow system clock signal 32 of the present invention defines a timing budget for performing synchronization. The sync counter 50 will restart again upon detecting the falling edge in the sampled system clock signal 40. The TICK counter 66 may progress counting or may be reset at any desired time.

The method of the present invention enables to very accurately synchronize the plurality of devices 6 within the system 1, in a predictable manner such that any delays between various devices 6 are fixed and predictable. The accuracy wherein this may be performed is sufficient for enabling synchronization of the various devices controlled by a quantum computer. However, the present method may also be applied in many other situations wherein the plurality of devices cooperatively preforms a certain task, wherein the various devices mutually have to be synchronized. In principal, by matching lengths of the cable of the clock distribution system 5, and the input 4-1 to 4-N of the devices 6-1 to 6-N, it is possible to reduce the propagation delay differences in the system clock signal 32 amongst various devices to less than 1 nanosecond. An internal clock signal 30 having a frequency of 250 megahertz, defines time cycles having a duration of 4 nanoseconds. Therefor, the present invention enables to perform synchronization amongst the various devices such that all devices are synced within a fraction of a single time cycle defined by their internal crock signals 30. It is to be noted that it is not essential that the internal clock signal 30 has a periodicity with a frequency of 250 megahertz, this frequency may be different, but ideally the frequency is an integer multiple of the frequency of the system clock signal 32. It is even not necessary that all devices 6-1 to 6-N operate at an internal clock signal 30 of a same frequency. The frequencies of the internal clock systems of various devices may differ without jeopardizing the predictability of the timing of signals. The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. Moreover, any of the components and elements of the various embodiments disclosed may be combined or may be incorporated in other embodiments where considered necessary, desired or preferred, without departing from the scope of the invention as defined in the claims.

In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. A method of synchronizing a plurality of devices, wherein each device of the plurality of devices operates synchronously with an internal clock signal such that actions performed by each device are timed based on time cycles defined by a periodicity of the internal clock signal, the internal clock signal of at least one device of the plurality of devices being periodic at a first frequency, wherein the plurality of devices is mutually synchronized via a party line to which each device of the plurality of devices is connected; the method comprising:

providing, from a system clock to each of the plurality of devices, a system clock signal that is periodic at a second frequency that is smaller than the first frequency, the second frequency thereby defining a plurality of sequential system clock cycles;

synchronizing, in each of the plurality of devices, the internal clock signal based on the received system clock signal; and triggering, by at least one device of the plurality of devices and synchronously with the system clock signal, a system synchronization comprising:

changing, by the at least one device during a first time cycle, a signal status of a common party line signal on the party line so as to signal the synchronization; and monitoring, by each device of the plurality of devices during a second time cycle, the common party line signal on the party line for registering the change in signal status of the common party line signal;

wherein the second cycle occurs later than the first time cycle and is separated from the first time cycle by one or more further time cycles, and wherein a duration from a start of the first cycle to an end of the second cycle is less than a duration of one system clock cycle.

2. The method according to claim 1, wherein the method further comprises a step of counting, by each of the plurality of devices, the time cycles defined by the internal clock signal using a sync counter; wherein the step of triggering is performed at a predefined sync counter value.

3. The method according to claim 1, wherein the system clock signal is distributed to each device using a clock distribution system, wherein the clock distribution system delivers the system clock signal to all devices simultaneously such that, for each two devices of the plurality of devices, a travel time difference between travel times of the system clock signal to each of the two devices is less than a single time cycle as defined by the first frequency.

4. The method according to claim 3, wherein the clock distribution system comprises a cable, respectively, between each one of the plurality of devices and the system clock to thereby include a plurality of cables, wherein a difference in cable length between each any two cables of the plurality of cables is smaller than 1 meter.

5. The method according to claim 1, wherein the first frequency is an integer multiple times as large as the second frequency.

6. The method according to an claim 1, wherein the first frequency is within a range of 1 megahertz to 10 gigahertz.

7. The method according to claim 1, wherein the second frequency is within a range of 20 kilohertz to 2 gigahertz.

8. The method according to claim 2, wherein the sync counter is periodically reset synchronously with the system clock signal.

9. The method according to claims 8, wherein the sync counter is periodically reset once every system clock cycle, wherein the first time cycle and the second time cycle are separated in time by half a system clock cycle.

10. The method according to claim 1, wherein the internal clock signal of each one of the plurality of devices is periodic at the first frequency, such that each one of the plurality of devices operates at a same internal clock frequency.

11. The method according to claim 1, wherein for one or more devices of the plurality of devices,. the internal clock signal is periodic at one or more further frequencies,. different from the first frequency, and wherein the changing is performed in response to a first signal change of the system clock signal and the monitoring is performed in response to a second signal change of the system clock signal.

12. A system comprising a plurality of devices, a system clock, a clock distribution system between the system clock and each device of the plurality of devices, and a party line interconnecting each of the plurality of devices and configured for enabling mutual synchronization of the plurality of devices via the party line, wherein each device operates synchronously with an internal clock signal so that actions performed by said device are timed based on time cycles defined by the periodicity of the internal clock signal, wherein at least one device of the plurality of devices is arranged for providing the internal clock signal so that the internal clock signal is periodic at a first frequency, wherein the system clock and the clock distribution system are configured for providing, to each device of the plurality of devices, a system clock signal that is periodic at a second frequency smaller than the first frequency, the second frequency thereby defining a plurality of sequential system clock cycles;

wherein each device is configured for synchronizing its internal clock signal based on the received system clock signal; and wherein at least one device of the plurality of devices is configured for triggering, synchronously with the system clock signal, a system synchronization comprising:

changing, by the at least one device during a first time cycle, a signal status of a common party line signal on the party line so as to signal the system synchronization; and monitoring, by each device of the plurality of devices during a second time cycle later than the first time cycle, the common party line signal on the party line for registering the change in signal status of the common party line signal;

wherein each device of the plurality of devices is configured for performing the monitoring during the second cycle after one or more further time cycles have passed so that a duration from a start of the first cycle to an end of the second cycle is less than a duration of one system clock cycle.

13. The system according to claim 12, wherein each device of the plurality of devices is configured for counting the time cycles defined by the internal clock signal using a sync counter; wherein the at least one device is configured for performing the triggering at a predefined sync counter value.

14. The system according to claim 12, wherein the clock distribution system, for conveying the system clock signal, comprises a cable, respectively, between each one of the plurality of devices and the system clock to thereby include a plurality of cables, wherein a difference in cable length between any two cables of the plurality of cables is smaller than 1 meter.

15. The system according to any of the claim 12, wherein the devices are elements of a quantum computer.

* * * * *